United States Patent [19]

Nakayama et al.

[11] Patent Number: 5,023,716
[45] Date of Patent: Jun. 11, 1991

[54] IMAGE INFORMATION SIGNAL TRANSMITTING SYSTEM

[75] Inventors: Tadayoshi Nakayama; Hisashi Ishikawa, both of Kanagawa; Susumu Kozuki, Tokyo; Koji Takahashi; Katsuji Yoshimura, both of Kanagawa; Kenichi Nagasawa; Tomohiko Sasatani, both of Kanagawa, all of Japan

[73] Assignee: Canon Kabushiki Kaisha, Tokyo, Japan

[21] Appl. No.: 608,634

[22] Filed: Oct. 31, 1990

Related U.S. Application Data

[63] Continuation of Ser. No. 460,284, Jan. 2, 1990, abandoned, which is a continuation of Ser. No. 325,543, Mar. 20, 1989, abandoned.

[30] Foreign Application Priority Data

Mar. 28, 1988 [JP] Japan ............................... 63-071962
Mar. 28, 1988 [JP] Japan ............................... 63-071963

[51] Int. Cl.$^5$ ........................ H04N 1/415; H04N 7/13
[52] U.S. Cl. ..................................... 358/138; 358/137
[58] Field of Search ........................ 358/133, 137, 138

[56] References Cited

U.S. PATENT DOCUMENTS 4,620,225 10/1986 Wendland ........................... 358/137
4,797,741 1/1989 Sato ..................................... 358/138

Primary Examiner—Howard W. Britton
Attorney, Agent, or Firm—Robin, Blecker, Daley & Driscoll

[57] ABSTRACT

An image information signal transmitting system of this invention is a system which divides an image information signal for one picture constituted by a set of picture element data into blocks each constituted by a predetermined quantity of picture element data, transmits the picture element data on each of the blocks on the basis of a mode selected from among a plurality of transmission modes each of which allows a different quantity of picture element data to be transmitted and a mode information signal indicative of the transmission mode of each of the blocks, and restores the picture element data on each of the blocks to the original image information signal. The system is arranged to store the transmitted picture element data, read out the stored picture element data at a data readout rate of one kind which is selected from among a plurality of different data readout rates and which corresponds to the kind of transmission mode indicated by the transmitted mode information signal, and implement a data restoring processing on the picture element data thus read on the basis of a data restoring processing of one kind which is selected from among a plurality of different data restoring processings and which corresponds to the kind of transmission mode indicated by the transmitted mode information signal. With this arrangement, it is possible to realize reductions in the size, weight and cost of the apparatus without deteriorating an image information signal to be transmitted.

12 Claims, 13 Drawing Sheets

IMAGE INFORMATION SIGNAL TRANSMITTING SYSTEM

This application is a continuation of application Ser. No. 460,284, filed Jan. 2, 1990, now abandoned, which is a continuation of U.S. Ser. No. 325,543, filed Mar. 20, 1989, now abandoned.

BACKGROUND OF THE INVENTION

1. Field of the Invention

The present invention relates to an image information signal transmitting system for transmitting image information signals.

2. Description of the Related Art

In the field of transmission of information such as image information, it has consistently been desired to provide a transmission method which enables the original information to be faithfully reproduced with a transmission rate as small as possible and, to this end, a variety of transmission methods have been proposed. One proposed transmission method is an adaptive type variable-density sampling method in which sampling density, that is, the density of the information to be transmitted, is appropriately varied. One example of such an adaptive type variable-density sampling method will now be explained with reference to a time-axis transforming band-compression method (hereinafter referred to as "TAT") which is adapted to a one-dimensional TAT system.

FIG. 1 is a view which serves to illustrate the basic concept of TAT. As shown by dashed lines in the figure, the original signal is divided into separate blocks at predetermined time intervals, and it is determined whether the information contained in each divided block is coarse or dense. If it is determined that the information of an arbitrary block is dense, all the data obtained by sampling the original signal corresponding to the block is transmitted as transmitted data, while, if it is determined that the information of an arbitrary block is coarse, only a portion of all the data obtained in a similar manner is transmitted as transmitted data. It is thus possible to reduce the amount of data to be transmitted per unit time and therefore to compress the bandwidth of a transmission signal. Simultaneously, a signal indicative of whether the original signal is dense or coarse is transmitted as transmission mode information.

On the basis of the transmission mode information, a receiving side makes a decision as to whether all or a portion of the sampled data of each block has been received. For a block whose sampled data has been partially received, interpolated data is formed from the received data so as to interpolate the portion of the sampled data which has not been transmitted. It is thus possible to obtain a restored signal which closely approximates the original signal.

The following is a description of a case where the above-described concept is applied to the transmission of image information.

Image information has a two-dimensional extension and has correlations in the horizontal and vertical directions. Accordingly, if not only the horizontal sampling intervals but also the vertical sampling intervals are rendered variable, more effective compression is enabled. Such a method is hereinafter referred to as "two-dimensional TAT".

FIG. 2 shows the data transmission patterns adopted in two-dimensional TAT. In two-dimensional TAT, a single picture is divided into picture element blocks consisting of m×n picture elements, and the amount of data to be transmitted is varied for each picture element block. FIG. 2 shows a picture element block which consists of 4×4 picture elements, and serves to illustrate the data transmission patterns used when each picture element block is to be transmitted selectively in either of two transmission modes In the figure, the symbols "o" represent picture elements to be transmitted, while the symbols "x" represent picture elements not to be transmitted. A pattern for transmitting all the picture element data is represented at E and a pattern for transmitting only a portion of the picture element data at C. The transmission modes using these transmission patterns are hereinafter referred to as the "E mode" and the "C mode", respectively. The picture elements which are transmitted from the picture element block in the C mode are hereinafter referred to as the "basic picture elements", and the remaining transmitted picture elements as the "high-fineness picture elements". As can be seen from FIG. 2, the density of information transmitted in the C mode is ¼ that of information transmitted in the E mode.

The non-transmitted picture elements contained in the picture element block transmitted in the C mode are restored to the original form on the receiving side by selecting picture element data close to the non-transmitted picture element data from the transmitted picture element data and forming interpolated picture element data by using the selected picture element data.

FIG. 3 shows the construction of the sending side of a conventional two-dimensional TAT transmission system of the type which utilizes analog transmission. An input analog image signal is converted into a digital signal by an AD converter 10. A thinning-out circuit 12 implements thinning-out processing, corresponding to the C-mode pattern of FIG. 2, of all the picture element data supplied from the A/D converter 10, and outputs C-mode picture element data. An interpolation circuit 14 computes interpolated picture element data from the C-mode picture element data output from the thinning-out circuit 12. A mode identifying circuit 16 compares the interpolated picture element data output from the interpolation circuit 14 with a true value from the A/D converter 10, and determines the transmission mode of each block (C or E mode). Concretely, the mode identifying circuit 16 calculates the total of the differences between the true values and the interpolated data in each block output from the interpolation circuit 14 (such a total is hereinafter referred to as the "block distortion"), and stores block distortions for one field in its memory.

Then, while data for the succeeding field is being input, the distribution of the block distortions of all the picture element blocks is obtained. In this step, in order to make constant the compression rate per field, it is necessary to make constant the ratio of the number of picture element blocks to be transmitted in the C mode to the number of picture element blocks to be transmitted in the E mode. For example, if the proportion of picture element blocks to be transmitted in the C mode is set to ⅔ of the number of picture element blocks per field and if the proportion of picture element blocks to be transmitted in the E mode is set to ⅓ of the total number picture element blocks per field, the total amount of data to be transmitted (compression rate)

becomes $\frac{1}{2}=(\frac{2}{3}\times\frac{1}{4}+\frac{1}{3}\times 1)$. Accordingly, in this step, a distortion threshold is determined which serves as a selection reference according to which selection of the transmission modes is carried out for each picture element block.

At the timing that an image signal of the succeeding field is input, the block distortions stored in the mode identifying circuit 16 are sequentially read out, and the transmission mode is determined for each picture element block by comparing the block distortion with the distortion threshold. If the block distortion coincides with the distortion threshold, the transmission modes are allocated so that the ratio of the number of picture element blocks to be transmitted in the C mode to the number of picture element blocks to be transmitted in the E mode is set to the aforesaid predetermined ratio. The mode identifying circuit 16 outputs a mode identifying signal indicative of the allocation of the transmission modes.

Reference numeral 18 denotes a buffer for E-mode picture element data and reference numeral 20 denotes a buffer for C-mode picture element data. In accordance with the mode identifying signal output from the mode identifying circuit 16, the switch 22 selects the output of the buffer 18 or 20 in units of blocks. The picture element data selected by the switch 22 is converted into an analog signal by a D/A converter 24 and output to a transmission path. The mode identifying signal is output through a buffer 26 to the transmission path as a mode information signal. This mode information signal is converted into an analog signal, frequency-multiplexed with an analog picture element signal, and then transmitted over the transmission path which is the same as that of the analog picture element signal.

FIG. 4 diagrammatically shows a receiving side which corresponds to the sending side shown in FIG. 3. The picture element signal input from the transmission path is converted into digital picture element data by an A/D converter 28, and the digital picture element data is supplied to a C-mode interpolation circuit 30 and a switch 32. The C-mode interpolation circuit 30 interpolates the non-transmitted picture elements of the picture element block transmitted in the C mode and outputs the result. If the mode information signal input to the switch 32 represents the C mode, the switch 32 is switched to a C contact, while if the input mode information signal represents the E mode, the switch 32 is switched to an E contact. Thus, all the picture element data including the E-mode picture element data, the C-mode picture element data, and the interpolated picture element data is stored in a frame memory 34. From the frame memory 34, all the picture element data is read out in the order conforming to, for example, a television signal, and is then converted into an analog image signal by a D/A converter 36.

In order to restore a television signal, the frame memory 34 having a storage capacity for at least one frame is needed on the receiving side of the aforesaid transmission system. In addition, the transmission rate of the C mode is four times as large as that of the E mode. Accordingly, if picture element data is to be transmitted at the rate of two samples per cycle time, it is necessary that the frame memory 34 have an $8(2\times 4)$-ply construction. As a result, the number of chips which can be selected becomes a multiple of 8, and the hardware construction of the memory frame 34 involves various difficulties such as a decrease in the utilization efficiency of memory and an increase in the number of chips. In addition, in recent years, the memory capacity per chip has been increasing, thereby making it possible to construct a frame memory with about 2 to 4 chips. However, in the case of the 8-ply construction, it is impossible to reduce the number of chips to 8 or less.

Furthermore, if the above-described two-dimensional TAT method is used to transmit, for example, a motion image such as a television signal, the resolution of a still-image portion contained in the television signal deteriorates to a remarkable extent. To overcome the problem, it has been proposed to provide a transmission method whose transmission rate can be reduced by utilizing correlations in the direction of a time axis, since the still-image portion exhibits high correlation in the direction of the time axis. This transmission method is called a three-dimensional TAT method. In the three-dimensional TAT method, no image data corresponding to a still-image portion is transmitted and, on a receiving side, the received image data which precedes in time is utilized as the non-transmitted data. In other words, the transmission of the still-image portion is omitted, but the transmission density of the other portion is enhanced instead, thereby achieving the enhancement of image quality.

In the three-dimensional TAT method, one picture is divided into a plurality of picture element blocks and, a mode for transmitting all the constituent picture element data (hereinafter referred to as the "e mode"), a mode for transmitting only data on picture elements which constitute a basic part of the constituent picture elements (basic picture elements) (hereinafter referred to as the "c mode"), and a mode for utilizing data on a corresponding block of a previously transmitted picture (hereinafter referred to as the "p mode") are selectively allocated under predetermined rules in order to make constant the amount of information transmitted per picture (for example, a compression rate of $\frac{1}{2}$). On a receiving side, signal processing corresponding to each mode is effected to restore the original image. A signal indicative of the allocation of the transmission modes is separately transmitted as mode information. In addition, in the p mode, basic picture element data alone may be transmitted in a manner similar to that used in the c mode and the receiving side may be arranged so that, if the transmitted data is the same as received data on the corresponding block contained in the preceding picture, it may be determined that not the C mode but the p mode is selected.

In the three-dimensional TAT method, a block distortion Dc for c-mode transmission is calculated in advance and, in order to review correlation in the direction of a time axis, the image signal of the preceding picture is stored in a frame memory. For each picture element block, a block distortion (the degree of time correlation) Dp is calculated by comparing the picture element data on the preceding picture with the picture element data on the current picture. Then, Dc is compared with Dp to make a decision, for each picture element block, as to which of the c-mode transmission and the p-mode transmission is smaller in block distortion. If Dc>Dp, the c mode is not selected and, if Dc<Dp, the p mode is not selected. In a case where a picture element block which was transmitted in the c mode during the transmission of the preceding picture is transmitted in the p mode for transmission of the current picture, the effect of improving image quality is not expected. Accordingly, the picture element block transmitted in the e mode during the transmission of the preceding picture is transmitted in the p mode for transmission of the current picture.

After the block distortions of all the picture element blocks which constitute one picture have been calculated in the above-described manner, the transmission modes are allocated for the respective picture element blocks and the picture element data on each picture element block is sequentially transmitted in accordance with the allocated transmission mode.

FIG. 5 illustrates the manner of mode distribution for the block distortions Dc and Dp, and FIG. 6 shows a distribution ratio based on the time correlation of an image. A picture element block representing a larger motion is located at an upper position on the Dp axis, while a high-fineness picture element block, that is, a picture element block having a higher two-dimensional frequency is located on the more right side on the Dc axis. The c or p mode is specified on the basis of the relationship between the magnitudes of Dc and Dp. Accordingly, the c mode is selected in a region above a straight line Dc=Dp of FIG. 5, while the p mode is selected in a region below the straight line. The value of Dm of a picture element block located at Xc takes on the value on the Dc axis which is obtained when a perpendicular line is dropped with respect to the Dc axis. The value of Dm of a picture element block located at Xp takes on the value on the Dc axis which is obtained when a perpendicular line is dropped with respect to the Dp axis and a perpendicular line is further drawn to the Dc axis from the intersection point of the former perpendicular line and the straight line Dc=Dp. In FIG. 5, if a threshold T1 for selection of the e mode is selected on the Dm axis, a threshold T2 is obtained on each of the Dc and Dp axes. That is to say, a picture element block represents a portion whose fineness is high and which shows a large motion is transmitted in the e mode.

The distribution ratio of each mode is as follows. The data compression rate of one picture is fixed at, for example, ⅓ and, if the amount of picture element data to be transmitted in the c or p mode is ¼ of the amount of picture element data which constitutes one picture element block, then the number of picture element blocks to be transmitted in the e mode occupies ⅓ of the total number of picture element blocks to be transmitted per field. In other words, as shown in FIG. 6, ⅓ of all the picture element blocks of one field is transmitted in the e mode and the remaining picture element blocks are transmitted in the p or c mode in accordance with the block distortion Dc or Dp. A straight line which constitutes the right side of FIG. 6 corresponds to a case where no correlated portion is present between two successive pictures and, in this case, processing identical to that used in the above-described two-dimensional TAT method is effected. The left side of FIG. 6 corresponds to a case where a perfect still image is transferred, and the obtained resolution is the same as that obtained when all the picture element blocks are transferred in the e mode. The mode distribution rate for an arbitrary picture is represented by the length of a line segment defined, on a broken line shown at A in FIG. 6, in each of the e-, c- and p-mode regions. The position of the broken line A depends upon the time correlation of image information.

FIG. 7 is a schematic block diagram showing a sending device according to a conventional three-dimensional TAT method of the type which employs an analog transmission path. An analog image signal to be transmitted is converted into a digital signal by an A/D converter 110. All the picture element data output from the A/D converter 110 is supplied to an thinning-out circuit 112, where all the data on the picture elements which exclude the aforesaid basic picture elements is eliminated. More specifically, the thinning-out circuit 112 outputs c-mode picture element data. An interpolation circuit 114 interpolates the picture element data eliminated by the thinning-out circuit 112 to reproduce the picture element block. A block distortion computing circuit 116 computes the block distortion Dc for each picture element block by comparing the picture element output from the A/D converter 110 with the interpolated c-mode data output from the interpolation circuit 114.

The output of the A/D converter 110 is supplied also to a frame memory 118 which serves as a delay element having delay time corresponding to one picture. More specifically, all the data on the preceding picture is stored in the frame memory 118 and a block distortion computing circuit 120 calculates the difference between the picture element data on the current picture and the picture element data on the preceding picture supplied from the frame memory 118 for each picture element block. The block distortion computing circuit 120 outputs the total of the aforesaid differences (or block distortion Dp). This block distortion Dp represents the degree of similarity in the direction of the time axis. A comparator circuit 122 compares Dc and Dp with each other with a predetermined weight attached thereto, and outputs the result of the comparison as selection mode data Dc/Dp as well as a smaller block distortion as block distortion Dm for identifying the transmission mode. That is to say, for each picture element block, the comparator circuit 122 makes a decision as to which of the c-mode transmission and the p-mode transmission enables an image to be transmitted more faithfully with respect to the e-mode transmission. Concretely, if Dc>Dp, the c mode is not selected, while if Dc<Dp, the p mode is not selected.

A mode identifying circuit 124 is a circuit in which the e mode is allocated for a predetermined number of picture element blocks in the order of magnitude of Dm. More specifically, the mode identifying circuit 124 obtains the threshold of Dm on the basis of the distribution of Dm of all the picture element blocks. The circuit 124 selects the e mode if the value of Dm exceeds the threshold while, if the value of Dm is not greater than the threshold, any mode other than the e mode is selected. When the value of Dm is not greater than the threshold, if Dc<Dp, then the c mode is allocated, while if Dc>Dp, the p mode is allocated. In accordance with the allocation, the mode identifying circuit 124 outputs a mode identifying signal indicative of the e mode or any other mode.

Regarding a picture element block to be transmitted in the p mode, its basic picture element data alone is transmitted in a manner similar to that used in the c-mode transmission. On a receiving side, the basic picture element data is compared with the basic picture element data on the corresponding picture element block in the preceding picture. If the basic picture element data of the current picture is the same as that on the preceding picture, it is determined that the basic picture element data was transmitted in the p mode, and the original image is restored by utilizing the picture element data on the preceding picture. If the basic picture element data on the current picture differs from that on the preceding picture, it is determined that the basic picture element data was transmitted in the c mode, and the original image is restored by an interpolation process. In addition, if a picture element block transmitted in the c mode during the transmission of the preceding picture is transmitted in the p mode for transmission of the current picture, the effect of improving image quality cannot be expected. It is determined, therefore, that the picture element block which was transmitted in the e mode during the transmission of the preceding picture is transmitted in the p mode for transmission of the current picture.

A switch 126 is controlled by the output of the mode identifying circuit 124. In the case of the e mode, the switch 126 delivers to a D/A converter 132 all the picture element data on each picture element block which is supplied from the A/D converter 110 through a buffer 128 to the switch 126. In the case of the c or p mode, the switch 126 delivers to the D/A converter 132 the basic picture element data on each picture element block which is supplied from the thinning-out circuit 112 through a buffer 130 to the switch 126. The D/A converter 132 converts digital picture element data into an analog signal and transmits the result to a transmission path. In the case of e-mode transmission, it is not necessary to rewrite data on any corresponding picture element block of the frame memory 118. The frame memory 118 is therefore set to a write-inhibit state in accordance with the identification signal output from the mode identifying circuit 124.

The mode identifying signal output from the mode identifying circuit 124 is further transmitted through the buffer 134 to the transmission path.

FIG. 8 is a block diagram showing the construction of a receiving system which corresponds to the sending system of FIG. 7. The analog video signal transmitted over the transmission path is converted into a digital signal by an A/D converter 170. A switch 172 is controlled by the received mode information. If each picture element block is transmitted in the e mode, the switch 172 outputs all the picture element data in the state which is the same as the state when it was received. In any other mode, the switch 172 outputs the picture element data interpolated by an interpolation circuit 174. Accordingly, the switch 172 always outputs all the picture element data on each picture element block, and this data is written into a frame memory 173 for all the picture elements. A switch 176 is likewise controlled by the received mode information. In the case of e-mode transmission, the switch 176 selects the output of a thinning-out circuit 178 for extracting basic picture element data from the picture element block transmitted in the e mode and, in any other mode, the switch 176 selects the output of the A/D converter 170. Accordingly, the switch 176 always outputs basic picture element data, and this data is written into a frame memory 180 for basic picture elements.

A block distortion computing circuit 182 computes the difference between the basic picture element data supplied from the switch 176 and the basic picture element data on the preceding picture supplied from the frame memory 180, thereby outputting the total of the differences for each picture element block (hereinafter referred to as the "block distortion Db"). The block distortion Db is compared with a threshold TH in the comparator circuit 184. If Db is smaller than TH, it is determined that the picture element block has been transmitted not in the c mode but in the p mode. An arithmetic circuit 186 generates a p identifying signal indicative of whether or not the p mode is selected, from the received mode information and the output of the comparator circuit 184, and supplies the p identifying signal to the frame memories 173 and 180. Thus, rewriting of the picture element blocks transmitted in the p mode is inhibited in the frame memories 173 and 180, and all the data on the preceding picture is held in the state which is the same as the state when the data was transmitted. In this fashion, the data of the frame memory 173 is up-dated and read into the D/A converter 188. The D/A converter 188 provides a high-resolution analog video signal.

In the receiving system used in the conventional example described above, both picture element information and mode information need to be accurately received and a memory address is calculated and determined in accordance with the mode information. It is, therefore, necessary to transmit the mode information simultaneously with or prior to the picture element information.

Where the mode information is to be transmitted prior to the picture element information by using, for example, a transmission path constituted by a magnetic tape, as shown in FIG. 9, a situation may be encountered in which the mode information cannot be received due to dropout. In such a situation, an image signal of the succeeding field may be fatally adversely affected.

SUMMARY OF THE INVENTION

It is, therefore, an object of the present invention to provide an image information signal transmitting system capable of overcoming the above-described problems.

It is another object of the present invention to provide an image information signal transmitting system which makes it possible to realize reductions in the size, weight and cost of the overall apparatus without deteriorating an image information signal to be transmitted.

To achieve the above objects, in accordance with the present invention, there is provided an image information signal transmitting system which is arranged to divide an image information signal for one picture constituted by a set of picture element data into blocks each constituted by a predetermined quantity of picture element data, transmit the picture element data on each of the blocks on the basis of a mode selected from among a plurality of transmission modes each of which allows a different quantity of picture element data to be transmitted and transmit a mode information signal indicative of the transmission mode of each of the blocks, and restore the transmitted picture element data on each of the blocks to the original image information signal. The present image information signal transmitting system is provided with storage means for storing the transmitted picture element data, data readout means for reading out the picture element data stored in the storage means at a data readout rate of one kind which is selected from among a plurality of different data readout rates and which corresponds to the kind of transmission mode indicated by the transmitted mode information signal, and data restoring means for implementing a data restoring processing on the picture element data read from the storage means on the basis of a data restoring processing of one kind which is selected from among a plurality of different data restoring processings and which corresponds to the kind of transmission mode indicated by the transmitted mode information signal.

The above and other objects, features and advantages of the present invention will become apparent from the following description of the preferred embodiments thereof, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
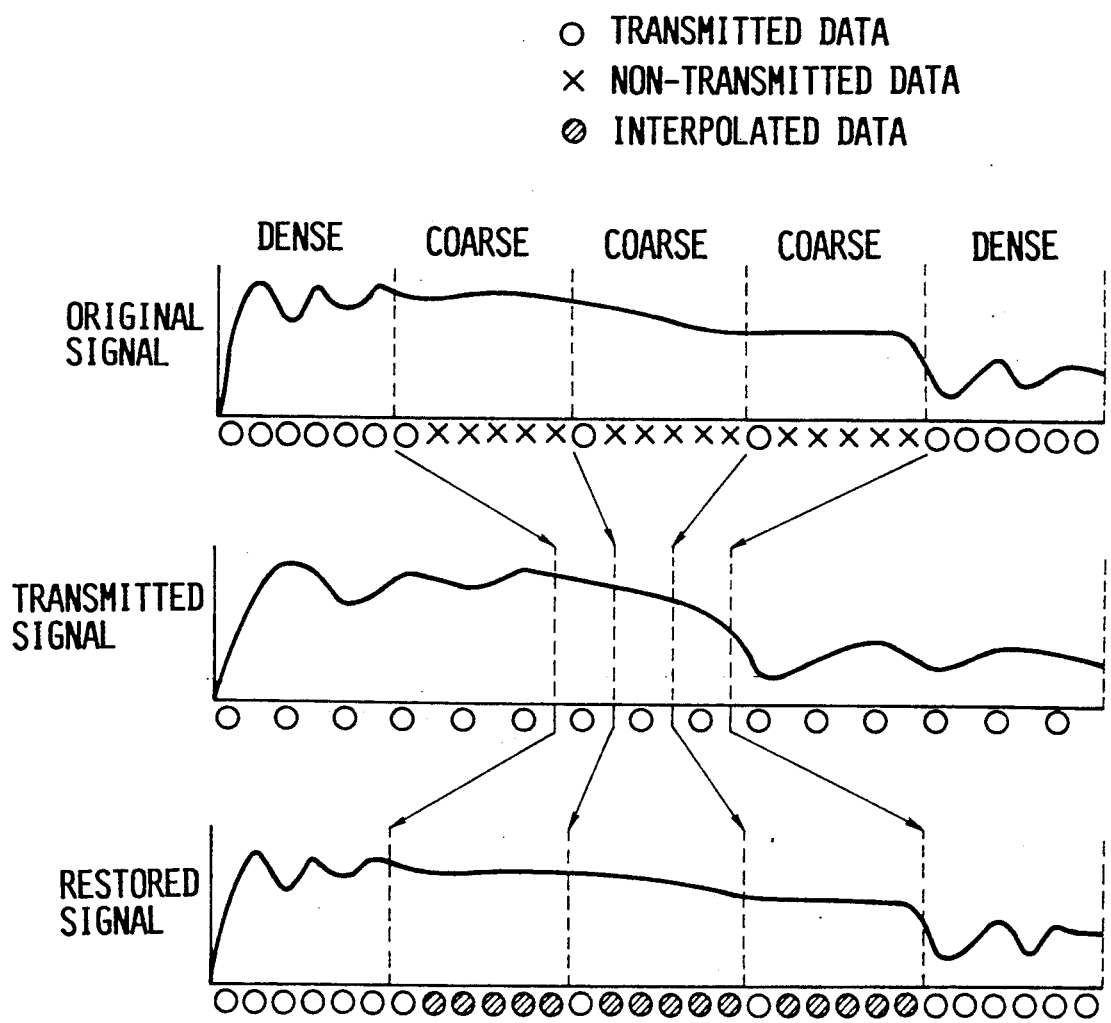
FIG. 1 is a view which serves to illustrate the basic concept of a TAT method.
Figure 2:
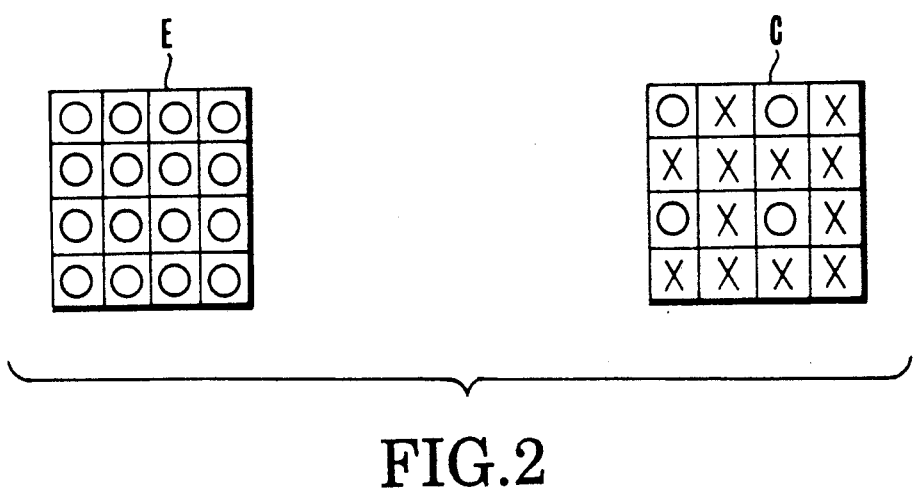
FIG. 2 is a view showing data transmission patterns in a two-dimensional TAT method.
Figure 3:
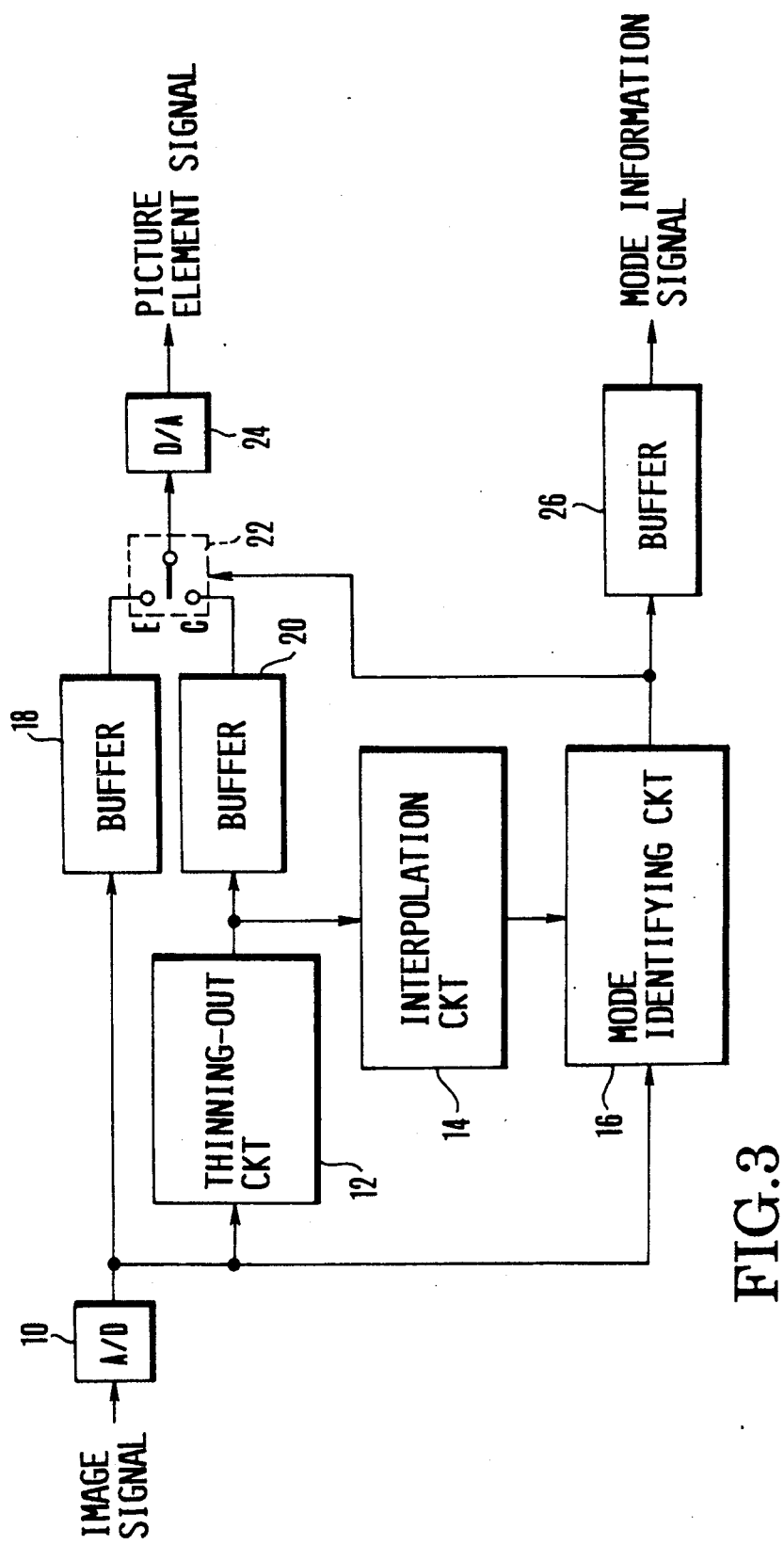
FIG. 3 is a block diagram showing an example of the construction of a conventional sending system for use in a two-dimensional TAT transmission system.
Figure 4:
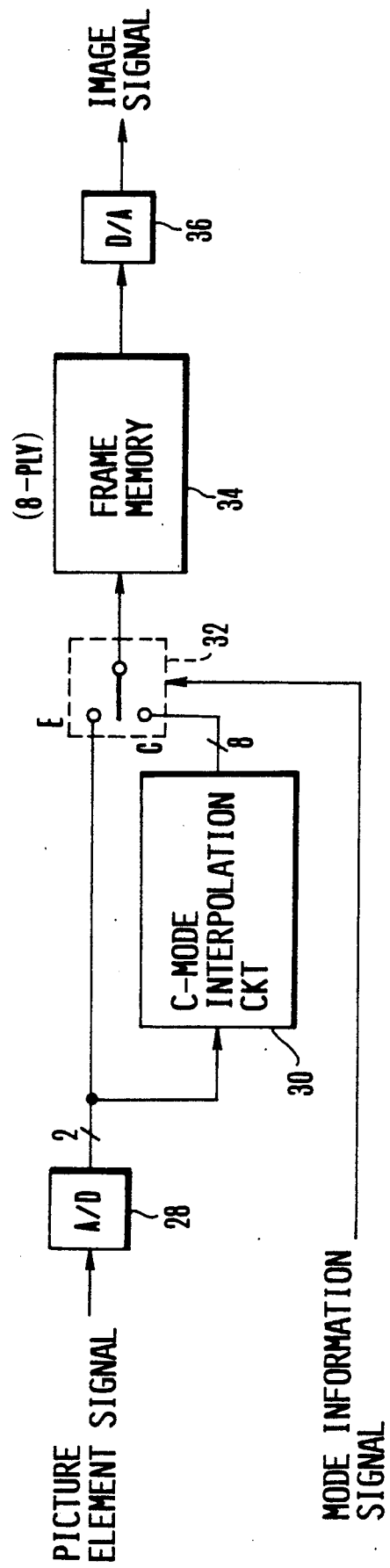
FIG. 4 is a block diagram showing an example of the construction of a conventional receiving system for use in the two-dimensional TAT transmission system.
Figure 5:
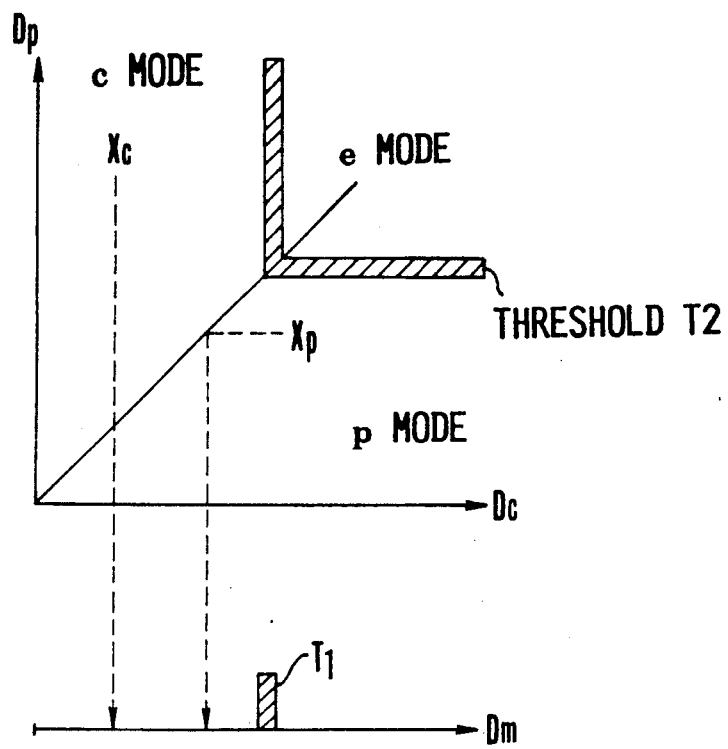
FIGS. 5 and 6 are views which serve to illustrate an example of mode distribution in a three-dimensional TAT method.
Figure 6:
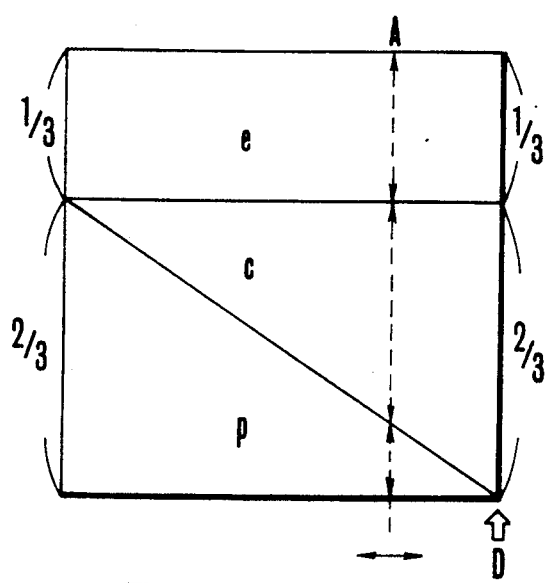
Figure 7:
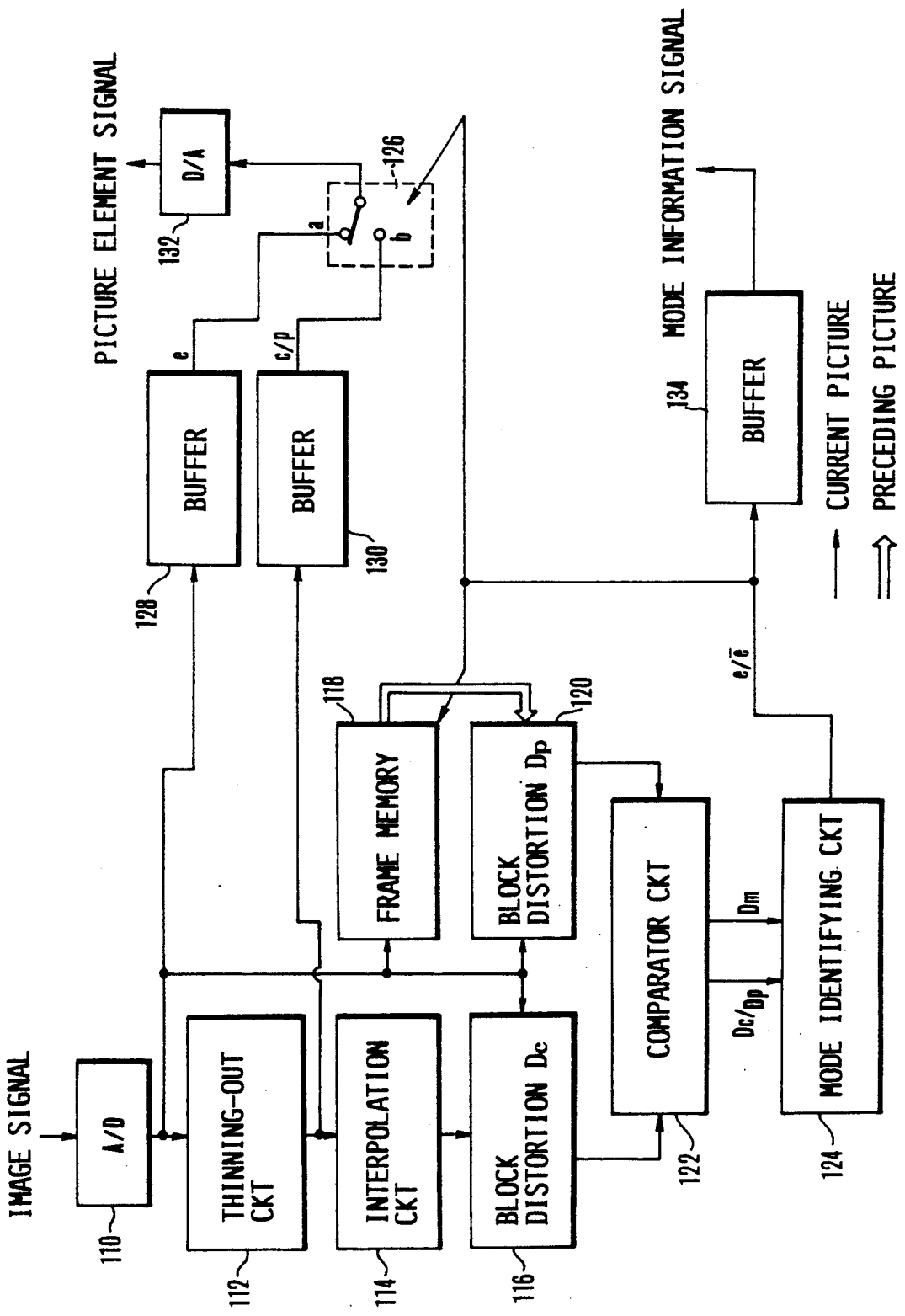
FIG. 7 is a block diagram showing an example of the construction of a conventional sending system for use in a three-dimensional TAT transmission system.

In the following description, it is assumed that an image information signal transmitting system according to a first embodiment of the present invention has a sending system which has the same construction as that shown in FIG. 3 and that a picture element signal including two samples is transmitted over an analog transmission path during one cycle time of a memory.

Figure 10:
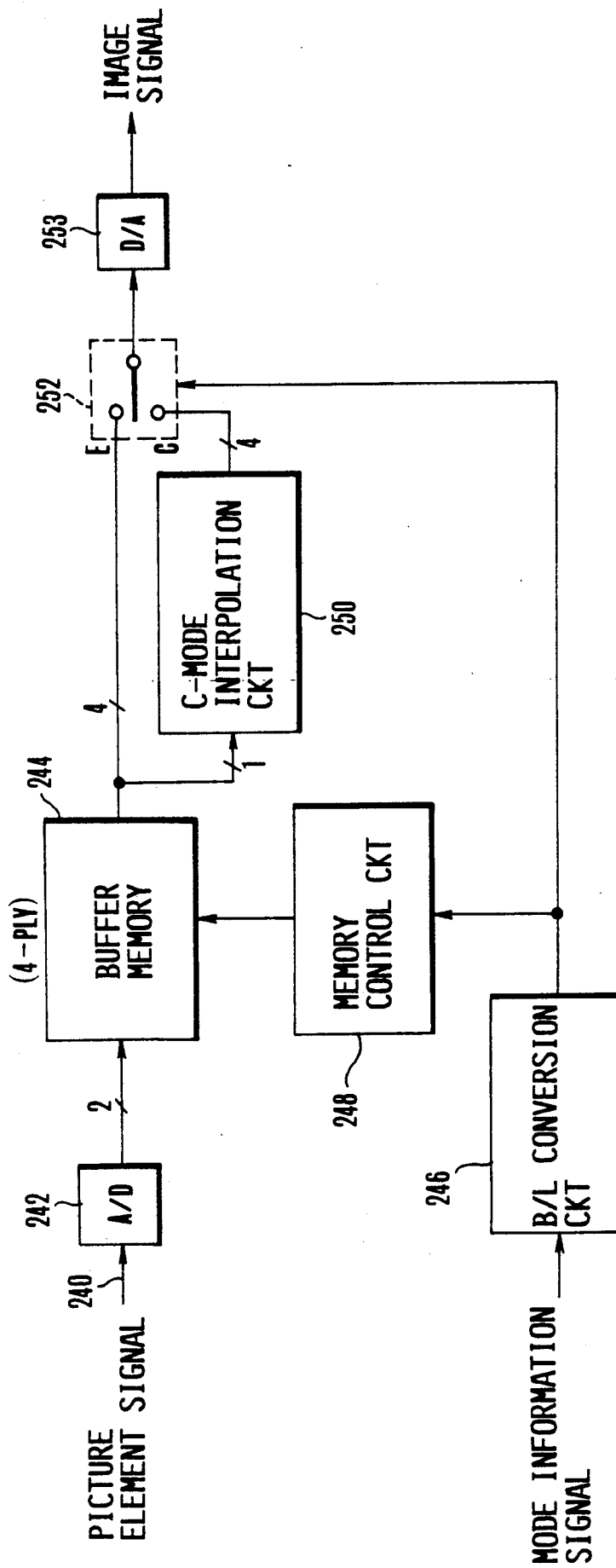
FIG. 10 is a block diagram showing the construction of a receiving system for use in an image information signal transmitting system according to a first preferred embodiment of the present invention.

FIG. 10 is a block diagram showing the construction of the receiving system of the image information signal transmitting system according to the first embodiment of the present invention. In the figure, a picture element signal 240, which is input through the transmission path, is converted into picture element data by an A/D converter 242 and input to a buffer memory 244, whereas the mode information input through the transmission path is converted from mode information on a block basis to mode information on a line basis by a block/line (B/L) conversion circuit 246. The mode information thus converted is supplied to a memory control circuit 248 and a switch 252. Incidentally, the B/L conversion circuit 246 temporarily stores the mode information, which is input on a block basis in a field memory or the like, and reads the same mode information from the field memory every four lines to convert the mode information allocated in units of blocks into mode information allocated in units of lines, then outputting the result. The memory control circuit 248 controls the buffer memory 244 in the following manner: The memory control circuit 248 writes the output data of the A/D converter 242 into the buffer memory 244 at the rate of 2 samples/cycle-time and converts the output data into signals in the order conforming to a television signal (raster scan). The buffer memory 244 is controlled to output, in the E mode, picture element data at a rate which is twice the rate of writing and, in the C mode, at a rate which is ½ of the rate of writing. Accordingly, in the E mode, the data of the buffer memory 244 is read out at the rate of 4 samples/cycle-time, while, in the C mode, the data is read out at the rate of 1 sample/cycle-time.

The picture element data output from the memory 244 is supplied to a C-mode interpolation circuit 250 and a switch 252. The C-mode interpolation circuit 250 computes picture element data for interpolating the non-transmitted portion from the basic picture element data, converts the result and the basic picture element data into raster scan data, and supplies the raster scan data to the switch 252. If the output of the B/L conversion circuit 246 assumes the C mode, the switch 252 is switched to a C contact, while if the output assumes the E mode, the switch 252 is switched to an E contact. Accordingly, all the picture element data on each picture element block is provided at the output of the switch 252, and the picture element data is converted into an analog signal by a D/A converter 253.

The maximum value of the access rate of the buffer memory 244 is 4 samples/cycle-time and the buffer memory 244 can therefore be constructed with four plies. In addition, since the stored data is compressed data, the required memory capacity is reduced to ½ in accordance with a compression rate (in this case, ½).

Figure 11:
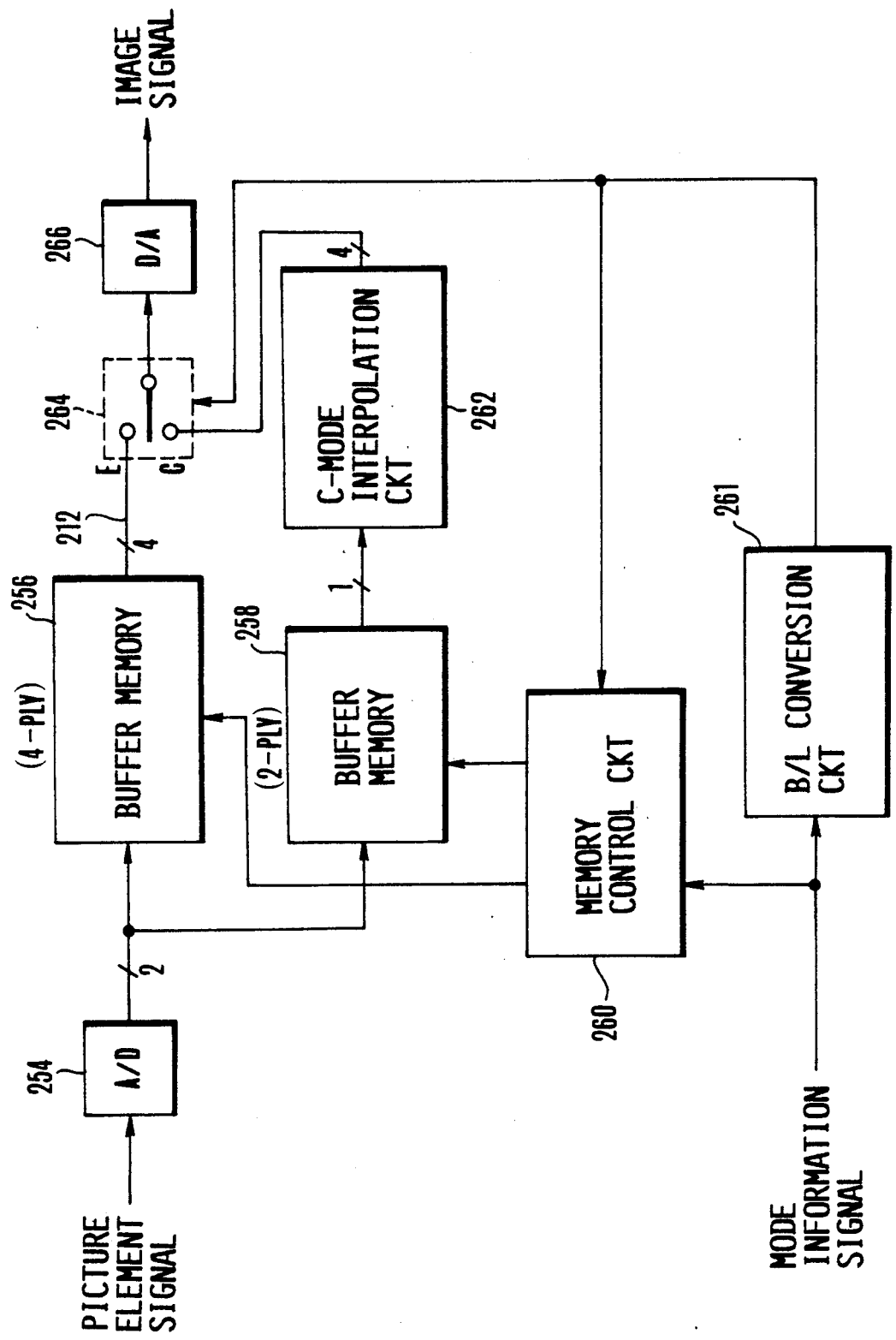
FIG. 11 is a block diagram showing the construction of a receiving system for use in an image information signal transmitting system according to a second preferred embodiment of the present invention.

FIG. 11 is a block diagram showing the construction of the receiving system of an image information signal transmitting system according to a second embodiment of the present invention. A detailed description of only the portions which differ from those shown in FIG. 10 will be given here, and it is assumed that the second embodiment is arranged to separately transmit E-mode picture element data and basic picture element data (C-mode picture element data). The picture element data digitized by the A/D converter 254 is supplied to buffer memories 256 and 258. If an input mode information signal represents the E mode, a memory control circuit 260 allows corresponding E-mode picture element data to be written into the buffer memory 256 and inhibits writing operation of the buffer memory 258. If an input mode information signal represents the C mode, the memory control circuit 260 allows corresponding basic picture element data to be written into the buffer memory 258 and inhibits a writing operation of the buffer memory 256. A B/L conversion circuit 261 converts input mode information on a block basis to mode information on a line basis in a manner similar to that used in the B/L conversion circuit 246 described above in connection with FIG. 10. The B/L conversion circuit 261 is provided with a delay circuit of a one-field delay period so as to give a delay for one field to the input mode information. If the output of the B/L conversion circuit 261 represents the E mode, the memory control circuit 260 controls the buffer memory 256 so that the stored signal may be read out at a rate which is twice the rate of writing (4 samples/cycle-time) in the order conforming to a television signal.

The buffer memory 256 converts picture element data on a block basis into raster scan data under the control of the memory control circuit 260. Simultaneously, the buffer memory 256 outputs the E-mode picture element data in the preceding field at a rate which is twice the rate of writing (i.e., at the rate of 4 samples/cycle-time) to supply the thus-read E-mode picture element data to a switch 264. Similarly, the buffer memory 258 converts basic picture element data on a block basis into raster scan data under the control of the memory control circuit 260. Simultaneously, the buffer memory 258 outputs the basic picture element data in the preceding field at a rate which is $\frac{1}{2}$ of the rate of writing (i.e., at the rate of 1 sample/cycle-time) to supply the data read to a C-mode interpolation circuit 262. The C-mode interpolation circuit 262 computes picture element data for interpolating a non-transmitted portion from the basic picture element data, converts the result and the basic picture element data into raster scan data, and supplies the raster scan data to the switch 264. The picture element block transmitted in the C mode is restored.

If the output of the B/L conversion circuit 261 assumes the C mode, the switch 264 is switched to a C contact, while if the output assumes the E mode, the switch 264 is switched to an E contact. The output of the switch 264 is converted into an analog signal by a D/A converter 266.

In the second embodiment described above in connection with FIG. 11, the maximum values of the write or read rates of the respective buffer memories 256 and 258 are 4 samples/cycle-time and 2 samples/cycle time and the buffer memories 256 and 258 may be constructed with four plies and two plies, respectively. In addition, the required memory capacities can be reduced to $\frac{1}{3}$ and $\frac{1}{4}$, respectively, 7/12 in total, which is about half the memory capacity required in the conventional system.

Figure 12:
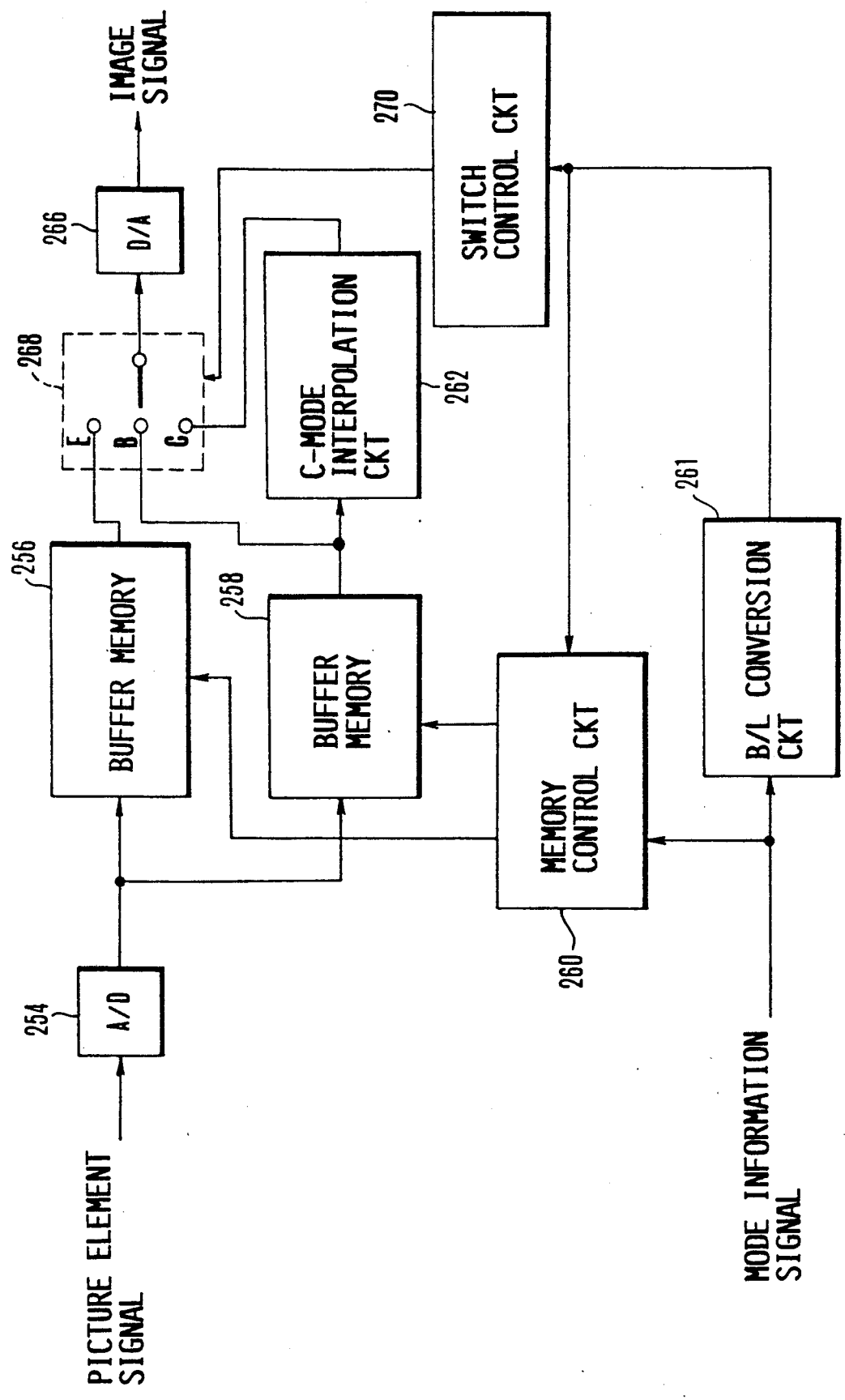
FIG. 12 is a block diagram showing the construction of a receiving system for use in an image information signal transmitting system according to a third preferred embodiment of the present invention.

In addition, if high-fineness picture element data of the E mode an basic picture element data are to be transmitted separately, the capacity of the buffer memory 256 becomes $\frac{1}{4}$ ($=\frac{1}{2}-\frac{1}{2}\times\frac{1}{2}$) and the total capacity of the buffer memories 256 and 258 becomes $\frac{1}{2}$ ($=\frac{1}{4}+\frac{1}{4}$). In this case, as shown in FIG. 12 which illustrates a third preferred embodiment, the switch 264 shown in FIG. 11 is replaced with a switch 268, and a switch control circuit 270 is disposed for controlling the switch 268 so that, in the case of basic picture element data of the E mode, the switch 268 is switched to a B contact.

Since the second and third embodiments of the present invention utilize separate buffer memories for E-mode picture element data and basic picture element data, those embodiments are suited for use in a system for separately transmitting E-mode picture element data and basic picture element data (C-mode picture element data).

Incidentally, although the above description is made with reference to the arrangement in which picture element data is transmitted in units of blocks, the picture element data may be transmitted in the order conforming to a television signal. In this case, the B/L conversion circuits 246 and 261 shown in FIGS. 10, 11 and 12 are not needed, and sorting of picture element data in the buffer memories 244, 256 and 258 is not needed. In addition, a mode information signal may be transmitted as digital data over a transmission path which differs from that of an analog picture element signal.

As can be understood from the above explanation, in each of the first to third embodiments, image information including a non-transmitted portion is stored in memory means in order to effect interpolation of the image information, whereby the capacity of the memory means can be reduced according to the proportion of the nontransmitted portion in transmitted image information. Accordingly, it is possible to manufacture image information processing systems with simplified hardware constructions at low cost.

Figure 8:
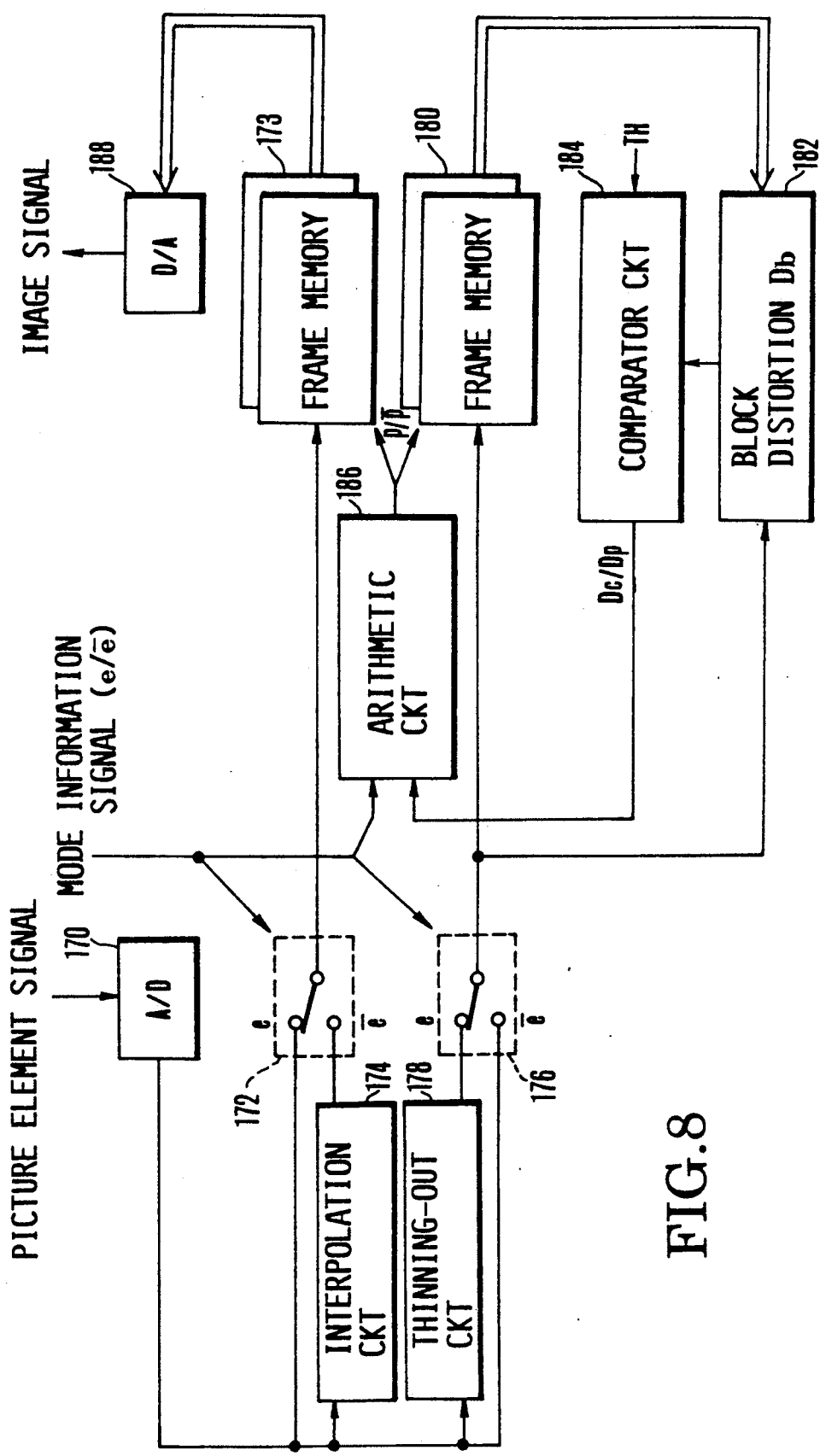
FIG. 8 is a block diagram showing an example of the construction of a conventional receiving system for use in the three-dimensional TAT transmission system.
Figure 9:
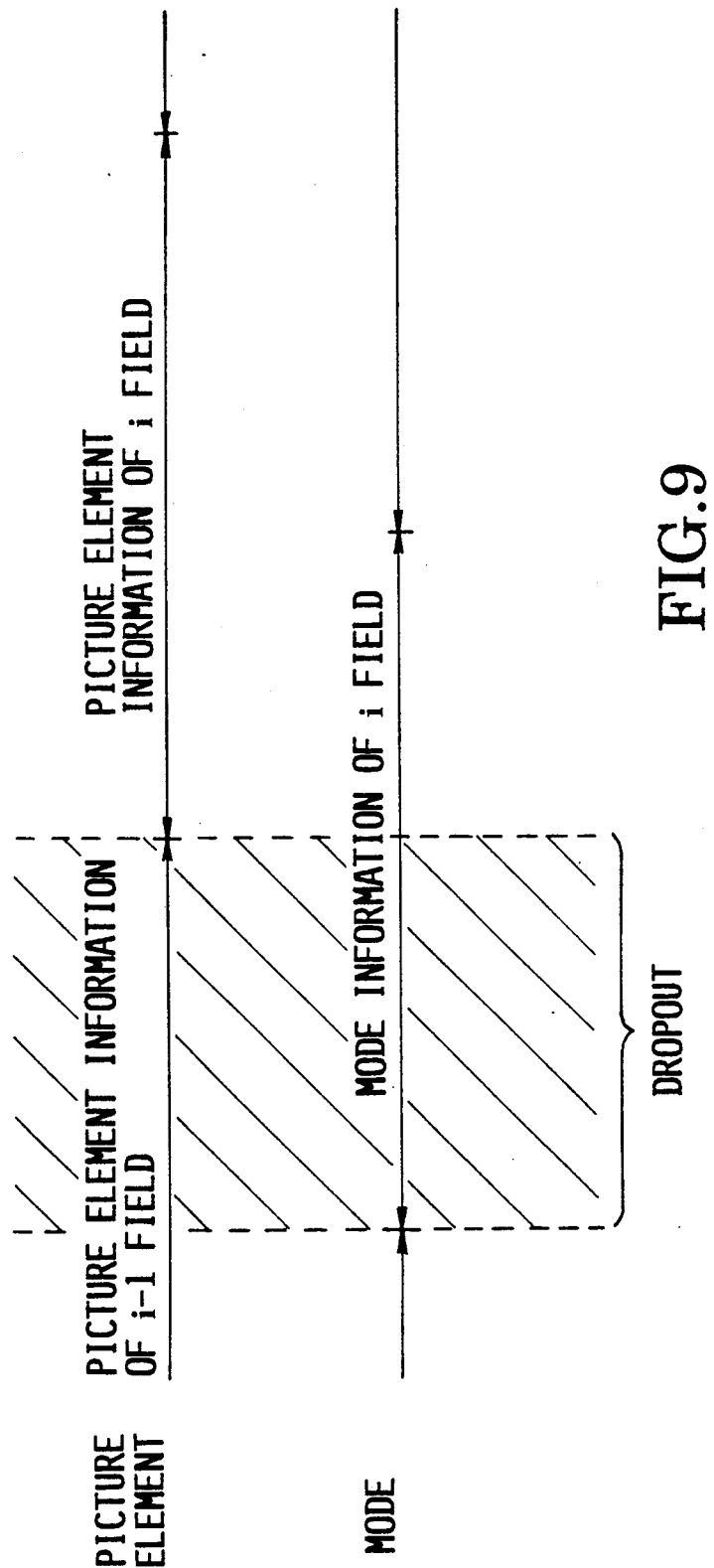
FIG. 9 is a timing chart showing transmitted information supplied to the receiving system shown in FIG. 8.
Figure 13:
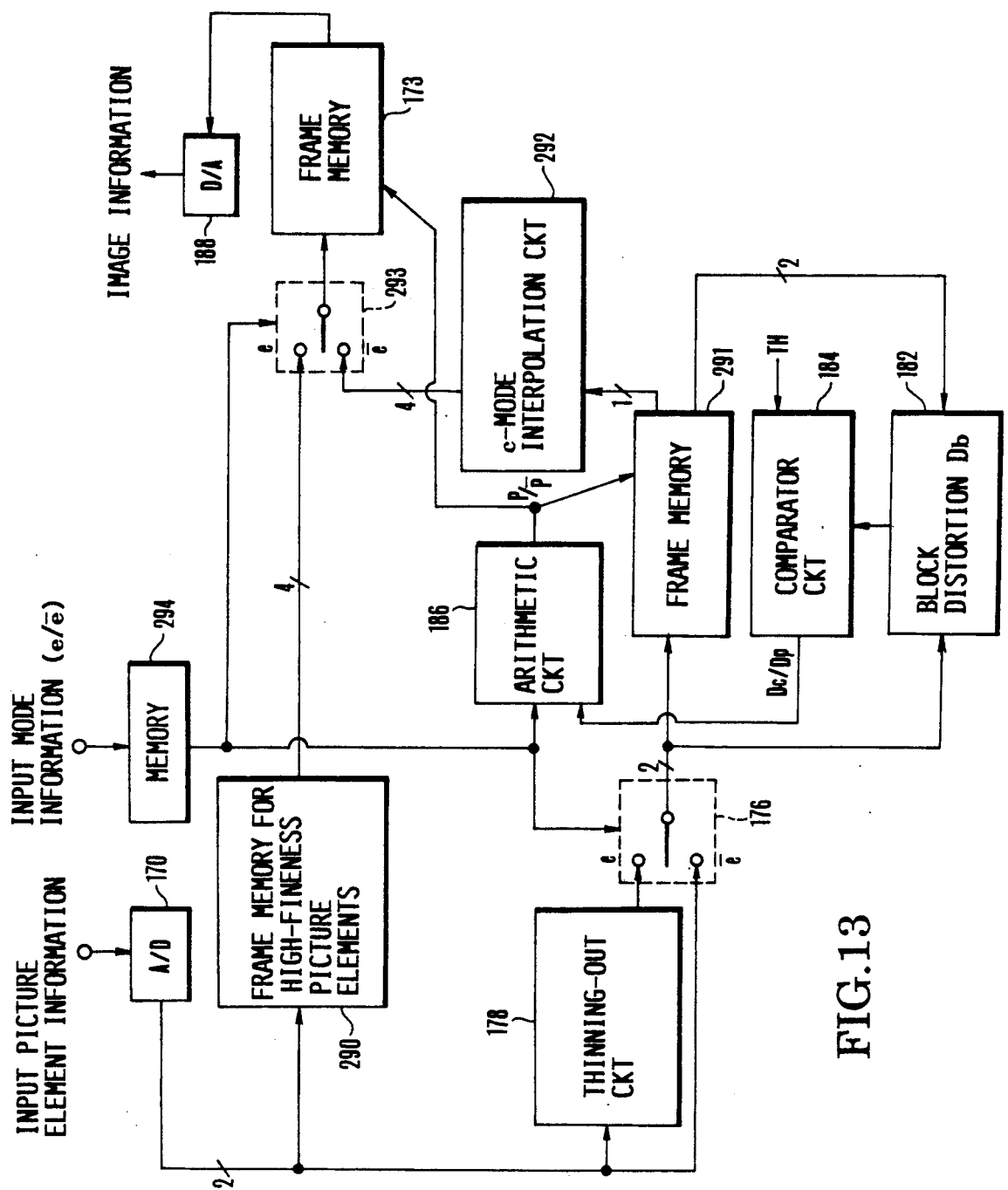
FIG. 13 is a block diagram showing the construction of a receiving system for use in an image information signal transmitting system according to a fourth preferred embodiment of the present invention.
Figure 14:
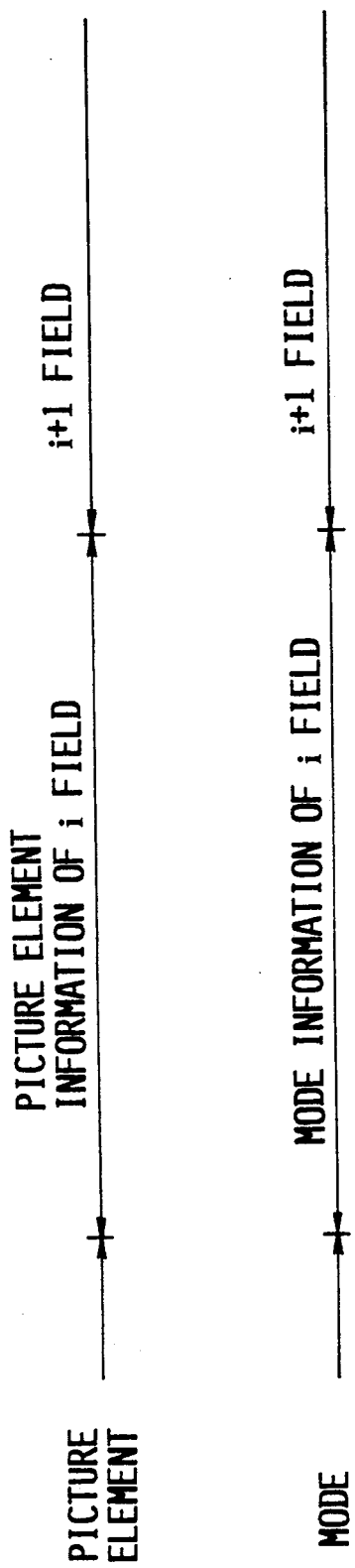
FIG. 14 is a timing chart showing input picture element information and an input mode information signal in the receiving system shown in FIG. 13.

FIG. 13 is a block diagram showing the construction of the receiving system used in an image information signal transmitting system according to a fourth embodiment of the present invention. In FIG. 13, the same reference numerals are used to denote the constituent elements which are the same as those shown in FIG. 8. In FIG. 13, reference numeral 290 denotes a 4-ply high-fineness picture element frame memory, reference numeral 291 a 2-ply basic picture element frame memory, reference numeral 292 a c-mode interpolation circuit, reference numeral 293 a switch which is switched in response to input mode information, and reference numeral 294 a memory used for delaying an input mode information signal by a predetermined time period in order to cause the input mode information signal among the input mode information signal and a picture element information signal, which are supplied at mutually different timings as shown in FIG. 9 mentioned above, to correspond in time to input picture element information as shown in FIG. 14. Incidentally, in the embodiment shown in FIG. 13, the frame memory 173 has a 4-ply construction and each of the frame memories 173, 290 and 291 has a cycle time $t_1$, and the A/D converter 170 effects sampling at the rate of 2 picture elements per $t_1$. Of the outputs of the A/D converter 170, basic picture element data is written into the frame memory 291 via the switch 176, while high-fineness picture element data is written into the frame memory 290. After writing into the frame memory 290 has been completed, the basic picture element data of the frame memory 291 is read out at a rate which is $\frac{1}{2}$ of the rate of writing, that is, at the rate of one picture element per $t_1$, and supplied to the c-mode interpolation circuit 292. The c-mode interpolation circuit 292 effects interpolation of non-transmitted picture elements and outputs serial data of four picture elements per $t_1$.

The output of the frame memory 290 is 4-picture-element parallel data which is read out at a rate which is twice the rate of writing, that is, at the rate of four picture elements per $t_1$. In accordance with the input mode information signal temporarily stored in the memory 294, the switch 293 selects the output of the frame memory 290 in the e mode and, in any mode other than the e mode, the output of the c-mode interpolation circuit 292. The signal selected by the switch 293 is supplied to the D/A converter 188 through the frame memory 173, and the D/A converter 188 outputs a corresponding analog image signal.

Also, the frame memory 291 supplies picture element data on the preceding picture to the block distortion computing circuit 182 for the purpose of arithmetic operations in the block distortion computing circuit 182.

As described above, the fourth embodiment realizes a method of transmitting mode information in correspondence with image information for one field and is arranged such that basic picture element data and high-fineness picture element data are temporarily stored in memory means. Accordingly, after all the picture element data for one field has been received, it is possible to carry out allocation of the e, c and p modes.

Although the above explanation has been made with illustrative reference to three-dimensional TAT, the fourth embodiment can of course be applied to two-dimensional TAT.

As can be readily understood from the foregoing, in the fourth embodiment, received picture element information and mode information are made to correspond to each other in time and, therefore, even if dropout or the like occurs during transmission, influence upon the succeeding field can be minimized.

What is claimed is:

1. An image information signal transmitting system which is arranged to divide an image information signal for one picture constituted by a set of picture element data into blocks each constituted by a predetermined quantity of picture element data, transmit the picture element data on each of said blocks on the basis of a mode selected from among a plurality of transmission modes each of which allows a different quantity of picture element data to be transmitted and transmit a mode information signal indicative of the transmission mode of each of said blocks, and restore said transmitted picture element data on each of said blocks to the original image information signal, comprising:
    (a) storage means for storing said transmitted picture element data;
    (b) data readout means for reading out said picture element data stored in said storage means at a data readout rate of one kind which is selected from among a plurality of different data readout rates and which corresponds to the kind of transmission mode indicated by said transmitted mode information signal; and
    (c) data restoring means for implementing a data restoring processing on said picture element data read from said storage means on the basis of a data restoring processing of one kind which is selected from among a plurality of different data restoring processings and which corresponds to the kind of transmission mode indicated by said transmitted mode information signal.

2. An image information signal transmitting system according to claim 1, wherein said storage means includes a plurality of different storage circuits which correspond to the kinds of said respective transmission modes and each of which stores said transmitted picture element data in accordance with said corresponding transmission mode indicated by said mode information signal, said data readout means being arranged to read said picture element data from said storage circuit corresponding to said transmission mode indicated by said transmitted mode information signal at a data readout rate corresponding to the kind of transmission mode.

3. An image information signal transmitting system according to claim 1, further comprising synchronizing means for effecting synchronization of said transmitted picture element data and said transmitted mode information signal.

4. An image information signal transmitting system according to claim 3, wherein said synchronizing means includes delay means for delaying said transmitted mode information signal.

5. An image information signal transmitting system according to claim 4, wherein said delay means includes a storage circuit.

6. An image information transmitting method for transmitting an image information signal for one picture constituted by a plurality of picture element data, comprising:
    (A) a first step of dividing said image information signal into a plurality of blocks each of which is constituted by a plurality of picture element data and then transmitting transmission data formed by processing the respective divided blocks in accordance with a motion of a picture image together with a process information corresponding to the processing effected on the respective blocks; and
    (B) a second step of storing the transmission data transmitted in said first step and storing the process information transmitted with said transmission data, in correspondence with said transmission data; and
    (C) a third step of effecting restoration processing of the transmission data stored in said second step, in correspondence with the stored process information.

7. A method according to claim 6, wherein said processing includes processing the respective divided blocks in accordance with a density of the corresponding picture image.

8. A method according to claim 6, wherein said third step includes reading out the transmission data stored in said second step at a readout rate corresponding to the process information stored in correspondence with said transmission data and effecting the restoration processing.

9. A image information transmitting method for transmitting an image information signal for one picture constituted by a plurality of picture element data, comprising:
    (A) a first step of dividing said image information signal into a plurality of blocks each of which is constituted by a plurality of picture element data and then transmitting transmission data formed by processing the respective divided blocks together with a process information corresponding to the processing effected on the respective blocks;
    (B) a second step of storing the transmission data transmitted in said first step and storing the process information transmitted with said transmission data, in correspondence with said transmission data;
    (C) a third step of reading out the transmission data and the process information stored in said second step in correspondence with each other, said third step being effected to read out the transmission data and the process information relating to a next picture in parallel with the storing operation effected in said second step; and
    (D) a fourth step of effecting restoration processing of the transmission data read out in said third step, in accordance with the process information read out in said third step in correspondence with said transmission data.

10. A method according to claim 9, wherein said processing includes processing the respective divided blocks in accordance with a motion of a picture image.

11. A method according to claim 9, wherein said processing includes processing the respective divided blocks in accordance with a density of the corresponding picture image.

12. A method according to claim 9, wherein said third step includes reading out the transmission data stored in said second step at a readout rate corresponding to the process information stored in correspondence with said transmission data and effecting the restoration processing.

* * * * *